(12) United States Patent
Sprote et al.

(10) Patent No.: US 10,689,064 B2
(45) Date of Patent: Jun. 23, 2020

(54) GEAR FOR A BICYCLE TRANSMISSION

(71) Applicant: Move Bikes GmbH, Muhlhausen (DE)

(72) Inventors: Tobias Sprote, Muhlhausen (DE); Stefan Schubert, Muhlhausen (DE); Marcus Rochlitzer, Muhlhausen (DE)

(73) Assignee: Move Bikes GmbH, Muhlhausen (DE)

( * ) Notice: Subject to any disclaimer, the term of this patent is extended or adjusted under 35 U.S.C. 154(b) by 0 days.

(21) Appl. No.: 16/311,824

(22) PCT Filed: Jun. 30, 2017

(86) PCT No.: PCT/EP2017/066379
§ 371 (c)(1),
(2) Date: Dec. 20, 2018

(87) PCT Pub. No.: WO2018/002361
PCT Pub. Date: Jan. 4, 2018

(65) Prior Publication Data
US 2019/0225300 A1 Jul. 25, 2019

(30) Foreign Application Priority Data

Jul. 1, 2016 (DE) .................. 10 2016 112 132
Jul. 1, 2016 (DE) ................. 20 2016 103 538 U

(51) Int. Cl.
*B62M 3/06* (2006.01)
*B62M 3/00* (2006.01)
(Continued)

(52) U.S. Cl.
CPC ............... *B62M 3/00* (2013.01); *B62M 1/36* (2013.01); *B62M 9/00* (2013.01); *B62M 9/08* (2013.01);
(Continued)

(58) Field of Classification Search
None
See application file for complete search history.

(56) References Cited

U.S. PATENT DOCUMENTS

| 515,449 | A | * | 2/1894 | Scovell | .................. 474/141 |
| 5,549,314 | A | * | 8/1996 | Sassi | .............. B62M 9/08 |
| | | | | | 280/236 |

(Continued)

FOREIGN PATENT DOCUMENTS

CN 102285426 A 12/2011
DE 202014002854 U1 * 6/2015 .............. B62M 3/06
(Continued)

OTHER PUBLICATIONS

International Search Report for PCT/EP2017/066379 dated Oct. 9, 2017 (German).
(Continued)

*Primary Examiner* — Dirk Wright
(74) *Attorney, Agent, or Firm* — Buchanan Ingersoll & Rooney PC

(57) ABSTRACT

A gear (10) for a bicycle transmission (20) is described, having an external contour (11) with teeth (12a, 12b) formed thereon, wherein the external contour (11) is defined by a maximum pitch diameter ($\varnothing_{max}$) and a minimum pitch diameter ($\varnothing_{min}$), does not have any axes of symmetry and is formed exclusively with point symmetry with respect to its centre of symmetry (M). The invention was therefore based on the problem of developing a gear (10) which improves the pedaling feel of a bicycle transmission (20). The problem is solved in that the external contour (11) exhibits a change in its curvature at every point.

12 Claims, 3 Drawing Sheets

(51) Int. Cl.
*B62M 11/14* (2006.01)
*B62M 9/08* (2006.01)
*B62M 1/36* (2013.01)
*B62M 9/00* (2006.01)
*B62M 11/02* (2006.01)
*F16H 1/46* (2006.01)
*F16H 35/00* (2006.01)
*F16H 55/30* (2006.01)

(52) U.S. Cl.
CPC ........... *B62M 11/02* (2013.01); *B62M 11/145* (2013.01); *F16H 1/46* (2013.01); *F16H 35/00* (2013.01); *F16H 55/30* (2013.01); *B62M 2003/006* (2013.01); *B62M 2009/002* (2013.01); *F16H 2035/003* (2013.01)

(56) References Cited

U.S. PATENT DOCUMENTS

| | | | |
|---|---|---|---|
| 5,611,744 A * | 3/1997 | Shen | B62M 9/085 |
| | | | 474/141 |
| 9,074,682 B2 * | 7/2015 | Choi | B62M 9/08 |
| 2019/0061871 A1 * | 2/2019 | Schubert | F16H 55/30 |

FOREIGN PATENT DOCUMENTS

| | | | |
|---|---|---|---|
| GB | 2385569 A | | 8/2003 |
| WO | 2015030576 A1 | | 3/2015 |

OTHER PUBLICATIONS

International Search Report for PCT/EP2017/066379 dated Oct. 9, 2017 (English).

* cited by examiner

GEAR FOR A BICYCLE TRANSMISSION

FIELD OF INVENTION

The invention relates to a gear for a bicycle transmission.

BACKGROUND OF THE INVENTION

In a bicycle transmission a gear is normally used to transfer the torque applied by the rider on pedal cranks to the rear wheel through a power transmission means. The power transmission means fits on the gear and can be a chain or a toothed belt.

DE 20 2004 006 544 U1 describes an oval, preferably elliptically shaped gear, intended to reduce rider fatigue by increasing the level of efficiency. The shape of the gear should be suited to the thrusting movements generated through the muscle power of the legs. It has proven to be a disadvantage, however, that the known gear only marginally improves the level of efficiency and also has a non-round pedaling feel, because the foot experiences different accelerations during one rotation of the pedal crank.

DE 10 2013 000 689 A1 and WO 2015/030576 also disclose non-round gears with multiple segments in the circumferential direction and a constant curvature radius within each segment, resulting in the outer contour having the same curvature. Only at the transfer point between adjacent segments, the constant curvature radius of a first segment changes to another curvature radius of a second segment, so that the curvature of the outer contour changes only at these transfer points. As soon as one of these transfer points engages in the pulling segment of a chain running on the gear, the rider feels a clear change in the pedal speed, which is perceived as unpleasant and annoying.

The effect of the non-round pedaling feel is also known from other transmissions for which efficiency level improvements were attempted. DE 10 2010 033 211 B4 describes a transmission of this type, in which a planet gear runs on a fixed sun gear and a crank arm rotates together with the planet gear, wherein the crank arm is mounted rotatably on a pedal crank. The sun gear, planet gear, and crank arm are all contained in the same crankcase, and the pedal crank is supported in a common crankcase by a guide roller in a guideway that is also contained in the crankcase. The guide roller spins freely and with lateral play on in the guideway, so the non-round pedaling feel in the circumferential direction of the gear is even stronger due to the free-spinning guide roller.

There is a need for a gear that improves the pedaling feel of a bicycle transmission.

SUMMARY OF THE INVENTION

A gear for a bicycle transmission has a body having an outer contour with teeth, wherein the outer contour is defined by a maximum pitch diameter $Ø_{max}$ and a minimum pitch diameter $Ø_{min}$. The gear has no axes of symmetry and is formed exclusively with point symmetry with respect to its center of symmetry. The outer contour has a curvature that changes at each point. The curvature change between all adjacent points of the outer contour leads to a decreased change in pedal speed while pedaling.

The outer contour is understood to be a connecting line running through the respective pitch diameters of the adjacent teeth. The outer contour corresponds to the path of a power transmission means that fits onto the gear, such as a chain or toothed belt.

Because a circular gear cannot be used according to the invention, the concept of a pitch diameter is used instead of a pitch circle diameter. The pitch diameter corresponds to the respective pitch circle diameter between two adjacent gears.

Preferably, the gear has four segments of the same size, wherein the maximum pitch diameter and the minimum pitch diameter run through a first and third segment and the first and third segments are aligned point-symmetrically around the symmetry center. The segments are created by a horizontal x-axis, which runs parallel to the ground, and a vertical y-axis that cuts through it at right angles, wherein the point at which the two axes intersect is located at the center of symmetry.

According to one especially advantageous embodiment, there are additional pitch diameters in the second and fourth segments whose lengths are between the maximum and minimum pitch diameters.

The goal is to have an angle $\alpha$ between the maximum pitch diameter and the minimum pitch diameter of the first and third segments of 50-70°, more preferably 55-65°, and especially preferably 58-62°. If the gear is installed in a bicycle transmission, the maximum pitch diameter lies in a range of the highest expected pedal speeds. The corresponding choice of angle $\alpha$ reduces pedal speeds in the area of a pedal position around the x-axis, thereby bringing them closer to a constant pedal speed.

Adjacent teeth can have different pitch diameters. This changes the pitch diameter from tooth to tooth, and no two adjacent teeth have the same pitch diameter. The respective pitch diameter of a tooth is preferably determined using a spline interpolation between the maximum and minimum pitch diameters.

Most desirably, the ratio of maximum pitch diameter to minimum pitch diameter is >1.30. The greater the ratio, the closer the pedal speeds come to a constant during one rotation. Of course, the dimensionless value imposes structural limits on the bicycle.

The invention also applies to a bicycle transmission that has a central shaft, supported with respect to a fixed frame element so that it rotates around a central bearing axis, a first sun gear, positioned concentrically to the central shaft and connected rigidly to the frame element, and at least one first gearing assembly that rotates with respect to the frame element The gearing assembly has a carrier plate whose first section is connected rigidly to the central shaft and on whose second section a planet gear is supported so that it rotates around its planet gear bearing axis. The planet gear engages the first sun gear and a crank arm rigidly engages the planet gear, as well as a pedal crank, on which the crank arm is supported so that it swivels and which is held against the carrier plate by a swing arm. The swing arm is attached to the carrier plate and the pedal crank so that it swivels, and the gear is in a fixed position on the central shaft.

On a free end of the pedal crank(s), as would be expected, a pedal is attached through which the rider imparts torque to the respective pedal crank by means of muscle power. The gear is configured such that maximum pedal speeds and minimum pedal speeds are as close as possible during one rotation of the gear. The preferred ratio between the maximum pedal speed and the minimum pedal speed is <2.00. Advantageously, the position of the pedal crank on the gear changes during one rotation of the gear.

Preferably, the minimum pitch diameter in the rotation direction is offset by an angle from a connecting line running between the central bearing axis and the planet gear bearing axis. Angle $\beta$ is within a range on the y-axis, i.e., a range of reduced pedal speed, and causes the pedal speed in that range to increase, thereby bringing it closer to a constant pedal speed. Angle can be between 1° and 15°, preferably 3° and 7°, and especially preferably 4° and 6°.

In a bicycle transmission it is considered to be particularly advantageous if there is a second sun gear that engages with a second gearing assembly that rotates with respect to the frame element. The second gearing assembly is offset by 180° from the first gearing assembly and comprises a carrier plate whose first section is attached to the central shaft so that it cannot rotate and to whose second section a planet gear is rotatably attached. The planet gear engages the second sun gear, and a crank arm rigidly engages the planet gear. There is a pedal crank, on which the crank arm is supported so that it swivels and which is held against the carrier plate by a swing arm. The swing arm is supported so that it swivels on the carrier plate and the pedal crank. The bicycle transmission therefore has two gearing assemblies, both affecting the same central shaft. This results in the advantage that the rider can pedal with both legs.

For better comprehension, the invention is explained in more detail below based on three figures.

DESCRIPTION OF THE PREFERRED EMBODIMENTS

Figure 1:
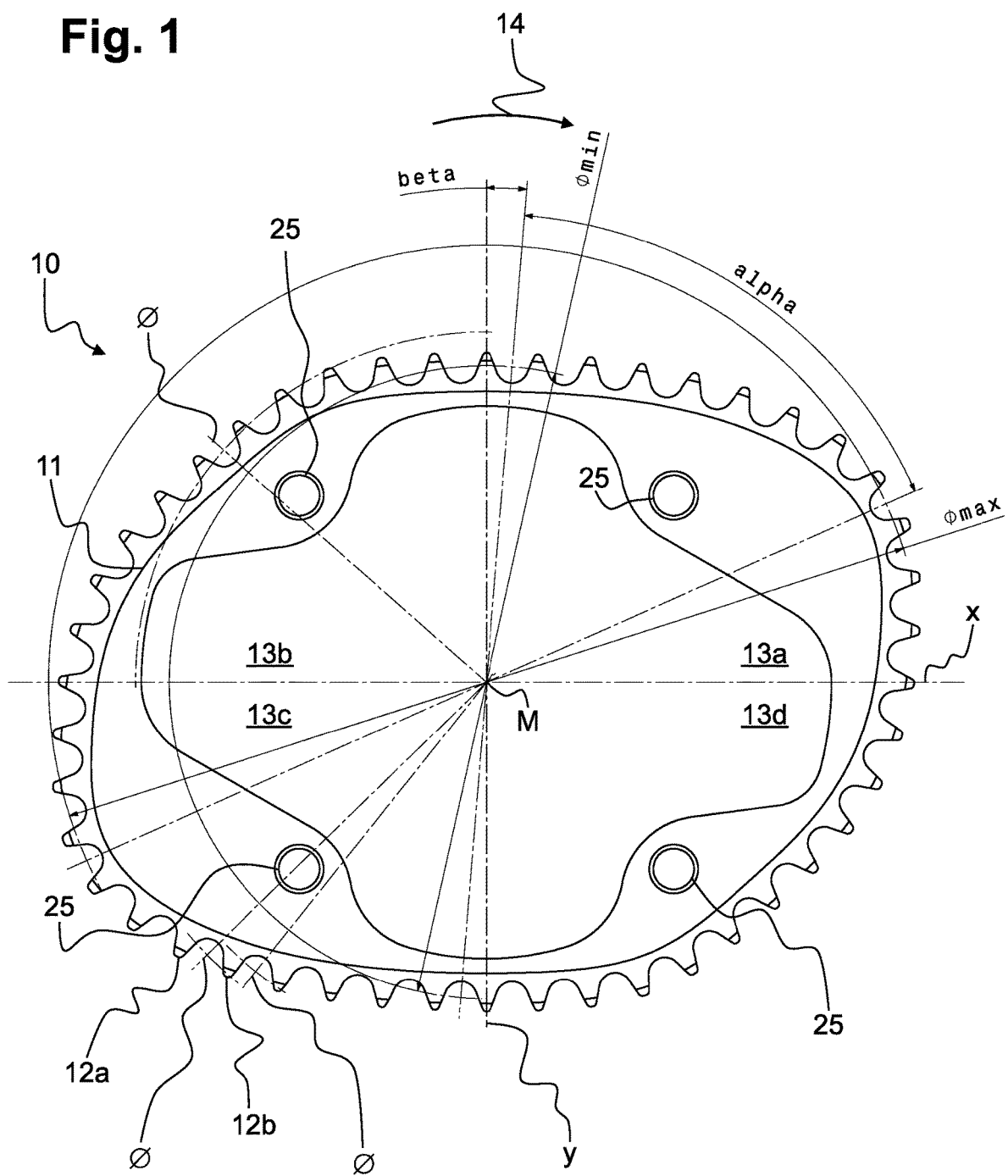
FIG. 1 is a side view of a gear according to the invention.

FIG. 1 shows a side view of a gear 10 having a body with an oval outer contour 11. The outer contour 11 fully encircles the circumference of the gear 10 and is the path of a power transmission means (not shown here) such as a chain or toothed belt. All around the outer contour 11 there are teeth 12a, 12b that allow an installed gear 10 to engage with the power transmission means. For illustrative purposes, the outer contour 11 in FIG. 1 is shifted inward equidistantly at all points, but its curvature pattern corresponds to the pattern through an individual pitch diameter Ø of adjacent teeth 12a, 12b.

Figure 2:
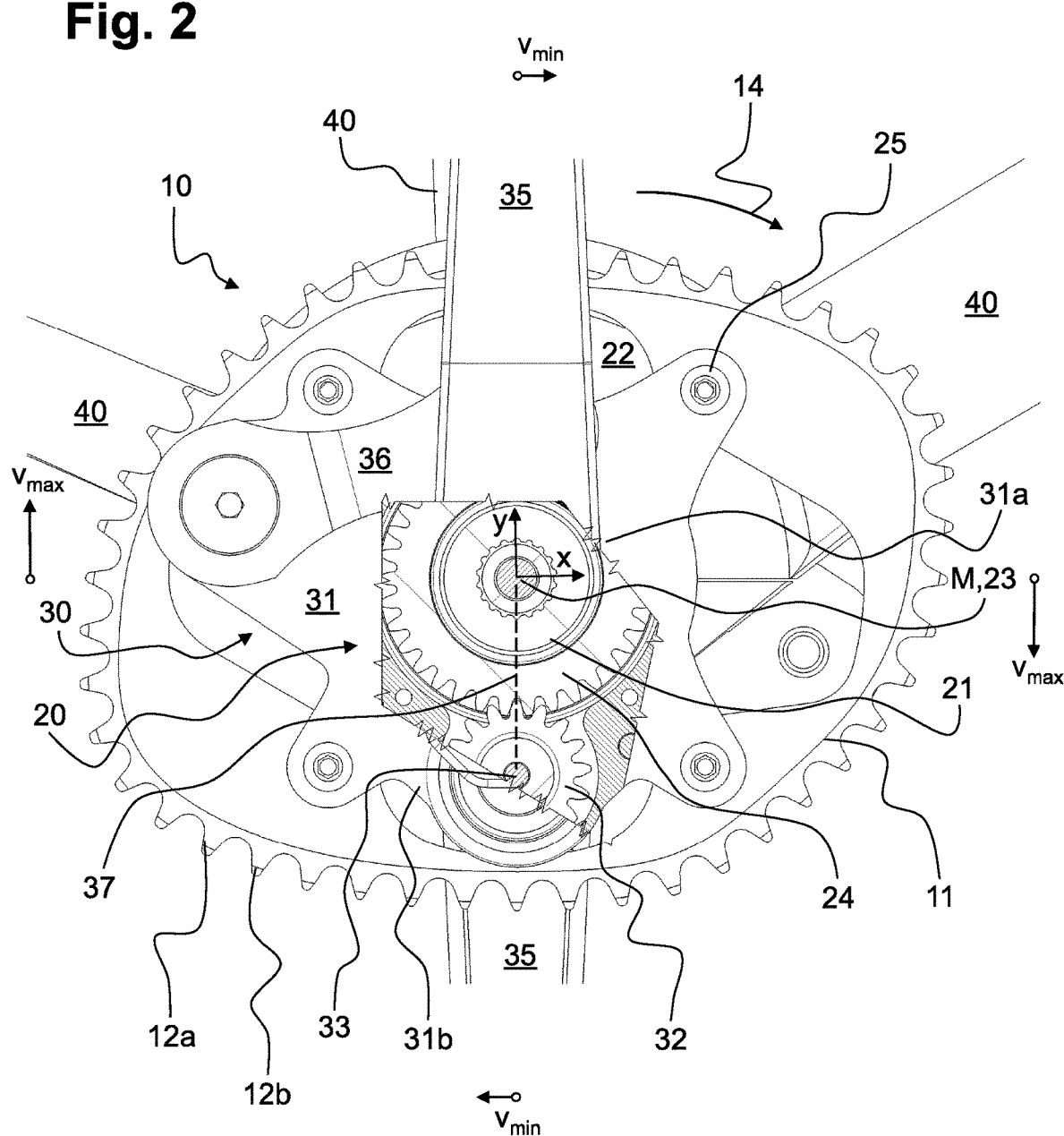
FIG. 2 is a partially cut away side view of the gear shown in FIG. 1 installed in a bicycle transmission.

The gear 10 has four fastener openings 25 equally spaced around its circumference, by means of which the gear 10 can be attached with a carrier plate 31 to a gearing assembly 30 in a bicycle transmission 20 (see FIG. 2).

The bicycle transmission 20 comprises a central shaft 21, attached coaxially inside a fixed sun gear 24 so that the sun gear rotates around the central bearing axis 23. The central shaft 21 thereby extends through a fixed frame element 22, by means of which the bicycle transmission 20 can be solidly attached to a bicycle frame 40.

The gearing assembly rotates around the sun gear 24 and comprises the carrier plate 31 and a planet gear 32 attached rotatably to a first section 31a. The planet gear 32 is permanently engaged with the sun gear 24 and rotates together with the carrier plate 31 around its periphery. A crank arm 34 is attached to the planet gear 32. The crank arm rotates rigidly together with the planet gear 32 and is fastened with a swivel connection to a pedal crank 35 extending upward (see FIG. 3). The pedal crank 35 is also connected to the carrier plate 31 by a swing arm 36 in the direction of its free end. The swing arm 36 engages both the pedal crank 35 and a second section 31b of the carrier plate 31 with a swivel connection.

Figure 3:
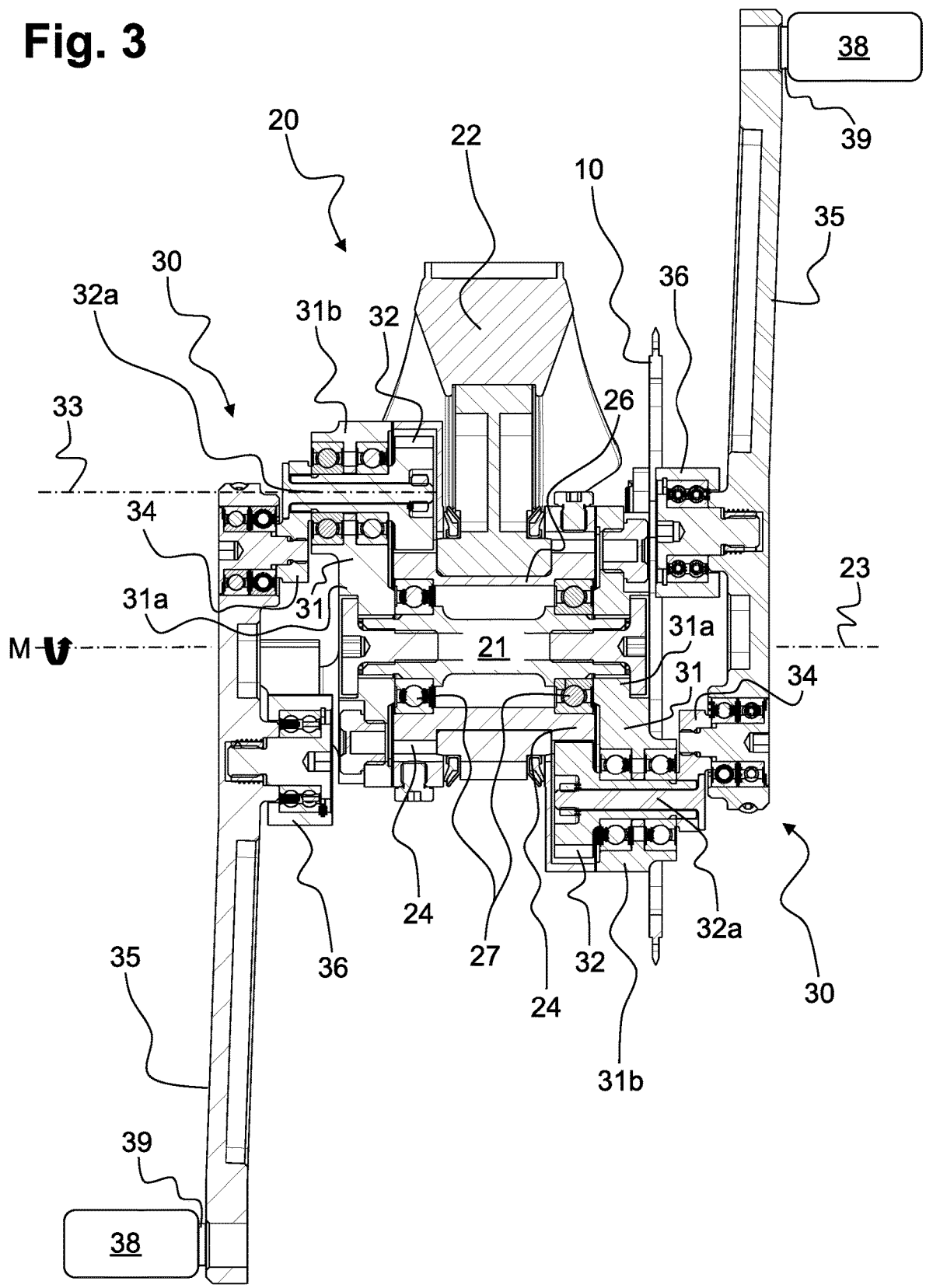
FIG. 3 is a lengthwise section through the bicycle transmission shown in FIG. 2.

On the back, which is covered by the frame element 22, there is another sun gear 24 that is also connected to an associated gearing assembly 30 and allows the rider to pedal on both sides. The only part of the back gearing assembly that can be seen in FIG. 2 is the pedal crank 35 extending downward. The two gearing assemblies 30 are identical in configuration and placed at 180° to each other, as shown in FIG. 3.

As can be seen in FIG. 1, the gear 10 is divided into four segments 13a, 13b, 13c, and 13d, each spanning a 90° angle around a center of symmetry M. The segments 13a, 13b, 13c, and 13d are divided by an x-axis running horizontally through the image plane, oriented to the ground or road surface, and a vertical y-axis running perpendicular to it. The alignment of the x-axis and y-axis is represented by the position of the central shaft 21 shown in FIGS. 2 and 3, wherein the center of symmetry M aligns with the central bearing axis 23 of the central shaft 21. The gear 10 rotates together with the segments 13a, 13b, 13c, and 13d when it is moved to engage synchronously with the central shaft 21.

The first segment 13a is shown at the upper right of the image plane in FIG. 1. It is followed, counterclockwise, by the second segment 13b, the third segment 13c, and the fourth segment 13d. Because of the point-symmetrical configuration of the outer contour 11, the segments 13a, 13b, 13c, and 13d are arranged point-symmetrically to each other.

The first segment 13a and the third segment 13b are configured respectively with a maximum pitch diameter $Ø_{max}$ and a minimum pitch diameter $Ø_{min}$. The maximum pitch diameter $Ø_{max}$ and the minimum pitch diameter $Ø_{min}$ therefore are not at right angles to each other, as they would be in an ellipse, but rather intersect at an angle α of <90°. In the invention example shown in FIG. 1, angle α=61.25°. This results in a lower maximum pedal speed $V_{max}$ around the x-axis, especially compared to a circular gear. However, the maximum pedal speeds $V_{max}$ indicated in FIG. 2 are still nearly twice as high as the minimum pedal speeds $V_{min}$.

In addition to reducing the maximum pedal speed $V_{max}$, the goal is to increase the minimum pedal speed $Ø_{max}$ around the y-axis of the minimum pitch diameter $Ø_{min}$ offset from the connecting line 37 by an angle β in the rotation direction 14 of the gear 10. In the illustrated vertical position of the pedal cranks 35 according to FIG. 2, the central bearing axis 23 and a planet gear bearing axis 33 are exactly on top of each other and aligned with the y-axis. The connecting line 37 runs precisely through the central bearing axis 23 and the planet gear bearing axis 33 and serves as the reference size for the angle to be created there.

The outer contour 11 in the area of the second segment 13b and the fourth segment 13d has a changing pitch diameter between adjacent teeth 12a and 12b, with a length between the maximum pitch diameter $Ø_{max}$ and the minimum pitch diameter $Ø_{min}$ of the first and third segments 13a and 13c.

The lengthwise section shown in FIG. 3 identifies the first and second sun gears 24, fixed with respect to the frame element 22, which are located on both outer sides of the frame element 22. Both sun gears 24 are attached solidly by a hollow cylinder 26 to form a one-piece integral assembly unit. A complete one-piece assembly is understood to involve a connection that cannot be separated other than by destroying it.

The central shaft 21 runs concentrically inside the hollow cylinder 26 and is supported so that it can rotate contiguously to sun gear 24 by means of a central shaft bearing 27. Due to the central shaft bearing 27 that is placed axially as far to the outside of the central shaft 21 as possible and coaxially inside of the sun gears 24, effective pull-out torques can be applied especially well to the central shaft 21.

The carrier plate 31 is mounted rigidly on each axial end section of the central shaft 21, and it rotates in a circle together with the central shaft 21 when the bicycle transmission is in operation. The connection between the carrier plate 31 and the central shaft 21 is made in the centrally located first section 31a of the carrier plate 31. In the radial direction of the carrier plate 31 there is an outer second section 31b, in which the planet gear 32 is held rotatably against the carrier plate 31.

On the outer end of a planet gear shaft 32a of the planet gear 32 with respect to the frame element 32, a crank arm 34 is either attached rigidly or formed as a complete one-piece component. The crank arm 34 extends in a radial direction with respect to the planet gear shaft 32a and engages rotatably with the pedal crank 35.

Power is provided to the bicycle transmission 20 through its two pedal cranks 35 on the respective gearing assemblies 30, located axially to the central shaft 21 on the outsides of the bicycle transmission. FIG. 3, like FIG. 2, shows the pedal cranks 35 and the gearing assembly 30 associated with each in an extended position, in which the crank arm 34 extends from the planet gear shaft 32a of the planet gear 32 radially inward toward the central shaft 21. This puts the free end of the pedal crank 35 in its farthest outward position. In order to achieve the most uniform pedaling feel with the most constant pedal speed possible, in this extended position the gear 10 effectively engages its power transmission means (not shown), with a minimum pitch diameter $Ø_{min}$ offset by the angle β, and thereby increases the existing minimum pedal speed $V_{min}$ in this area.

The lengthwise cut in FIG. 3 also clearly shows that the crank arm 34 can also move to a position rotated 180°, thereby placing the free end of the pedal crank 35 in a powered position. In this powered position (not shown here), the gears 12a, 12b effectively engage the power transmission means within angle α, which reduces the existing maximum pedal speed $V_{max}$ in this area.

On the free end of each pedal crank 35, as shown in FIG. 3, for example, a pedal 38 is attached that can rotate with respect to the associated pedal crank 35 by means of a pedal bearing 39. The pedal bearing 39 has a bearing axis that is fixed with respect to the pedal crank 35.

The invention claimed is:

1. A gear for a bicycle transmission, the gear comprised of a body having an outer contour with teeth, wherein the outer contour is defined by a maximum pitch diameter $Ø_{max}$ and a minimum pitch diameter $Ø_m$, has no axes of symmetry, and is formed exclusively with point symmetry with respect to its center of symmetry, and has a curvature that changes at each point.

2. The gear as in claim 1, wherein the gear has four segments each segment of a same size, wherein the maximum pitch diameter $Ø_{max}$ and the minimum pitch diameter $Ø_{min}$ run through a first and third segment and the first and third segments are aligned point-symmetrically around the center of symmetry.

3. The gear as in claim 2, wherein the second and fourth segments have exclusive pitch diameters Ø whose lengths are between the maximum pitch diameter $Ø_{max}$ and the minimum pitch diameter $Ø_{min}$.

4. The gear as in claim 2, wherein there is an angle α between the maximum pitch diameter $Ø_{max}$ and the minimum pitch diameter $Ø_{min}$ of the first and third segments which is at least one of between 50° and 70°, between 55° and 65° and between 58° and 62°.

5. The gear as in claim 3, wherein there is an angle α between the maximum pitch diameter $Ø_{max}$ and the minimum pitch diameter $Ø_{min}$ of the first and third segments which is at least one of between 50° and 70°, between 55° and 65° and between 58° and 62°.

6. The gear as in claim 1 wherein the adjacent teeth each have a different pitch diameter Ø.

7. The gear as in claim 1, wherein a ratio of maximum pitch diameter $Ø_{max}$ to minimum pitch diameter $Ø_{min}$ is greater than 1.30.

8. A combination of a bicycle transmission and a gear, the bicycle transmission comprising:
a central shaft supported with respect to a fixed frame element so that the central shaft rotates around a central bearing axis,
a first sun gear, positioned concentrically to the central shaft and connected rigidly to the frame element, and
at least one first gearing assembly that rotates with respect to the frame element in the gearing assembly, the gearing assembly comprising a carrier plate having a first section connected rigidly to the central shaft, and a planet gear supported on the carrier plate so that the planet gear rotates around a planet gear bearing axis, wherein the planet gear engages the first sun gear,
a crank arm rigidly engaging the planet gear,
a swing arm, and
a pedal crank on which the crank arm is supported so that the pedal crank swivels and which is held against the carrier plate by the swing arm, wherein the swing arm is attached to the carrier plate and the pedal crank so that the swing arm swivels, and
the gear attached to the carrier plate, the gear comprising a body having an outer contour with teeth, wherein the outer contour is spanned by a maximum pitch diameter $Ø_{max}$ and a minimum pitch diameter $Ø_{min}$, has no axes of symmetry, and is formed exclusively with point symmetry with respect to its center of symmetry, and has a curvature that changes at each point, wherein the gear is in a fixed position on the central shaft.

9. The combination as in claim 8, wherein the minimum pitch diameter $Ø_{min}$ in a rotation direction is offset by an angle β from a connecting line running between a central bearing axis and a planet gear bearing axis.

10. The combination as in claim 9, wherein the angle β is at least one of between 1° and 15°, between 3° and 7°, and between 4° and 6°.

11. The combination as in claim 8, wherein a position of the pedal crank on the gear changes during one rotation of the gear.

12. The combination as in claim 8, also comprising:
a second sun gear,
a second gearing assembly with which the second sun gear interacts, the second gearing assembly able to rotate with respect to the frame element, wherein the second gearing assembly is offset by 180° from the first gearing assembly, the second gearing assembly comprising a planet gear, a carrier plate having a first section connected rigidly to the central shaft and a second section on which the planet gear is supported so that the planet gear rotates, the planet gear engaging the second sun gear,
a crank arm that rigidly engages the planet gear, a pedal crank, on which the crank arm is supported so that the crank arm swivels and which is held against the carrier plate by a swing arm, wherein the swing arm is attached to the carrier plate and the pedal crank so that the swing arm swivels.

\* \* \* \* \*